United States Patent
McCartney

(10) Patent No.: US 9,804,471 B2
(45) Date of Patent: Oct. 31, 2017

(54) PASSIVE MATRIX DISPLAY DEVICE AND METHOD OF MAKING THE SAME

(71) Applicant: SAMSUNG DISPLAY CO., LTD., Yongin, Gyeonggi-Do (KR)

(72) Inventor: Richard I. McCartney, Scotts Valley, CA (US)

(73) Assignee: Samsung Display Co., Ltd, Yongin-si (KR)

( * ) Notice: Subject to any disclaimer, the term of this patent is extended or adjusted under 35 U.S.C. 154(b) by 85 days.

(21) Appl. No.: 14/804,222

(22) Filed: Jul. 20, 2015

(65) Prior Publication Data

US 2016/0033845 A1 Feb. 4, 2016

Related U.S. Application Data

(60) Provisional application No. 62/031,778, filed on Jul. 31, 2014.

(51) Int. Cl.
| | | |
|---|---|---|
| *G02F 1/03* | (2006.01) | |
| *G02F 1/07* | (2006.01) | |
| *G02B 26/00* | (2006.01) | |
| *G02F 1/167* | (2006.01) | |
| *G02F 1/1343* | (2006.01) | |

(52) U.S. Cl.
CPC ........ *G02F 1/167* (2013.01); *G02F 1/134336* (2013.01)

(58) Field of Classification Search
USPC ........ 359/242, 265–267, 270–273, 315, 321, 359/322, 290–292, 295, 296, 298
See application file for complete search history.

(56) References Cited

U.S. PATENT DOCUMENTS

2006/0262257 A1* 11/2006 Hattori .................... G02F 1/167
349/114
2010/0214247 A1* 8/2010 Tang ...................... H03K 17/98
345/173

FOREIGN PATENT DOCUMENTS

| KR | 10-2004-0048944 A | 6/2004 |
| KR | 10-2010-0043739 A | 4/2010 |
| KR | 10-2010-0121630 A | 11/2010 |
| KR | 10-2011-0004783 A | 1/2011 |

* cited by examiner

*Primary Examiner* — Brandi Thomas
(74) *Attorney, Agent, or Firm* — Lewis Roca Rothgerber Christie LLP

(57) ABSTRACT

A passive matrix display device includes a first electrode panel including a first substrate, a plurality of anisotropic conductive lines extending in a first direction, and a plurality of first electrodes, each of the first electrodes including some of the plurality of anisotropic conductive lines, and others of the plurality of anisotropic conductive lines being arranged between and contacting both adjacent ones of the first electrodes; a second electrode panel including a second substrate, a plurality of anisotropic conductive lines extending in a second direction crossing the first direction, and a plurality of second electrodes, each of the second electrodes including some of the plurality of anisotropic conductive lines, and others of the plurality of anisotropic conductive lines being arranged between and contacting both adjacent ones of the second electrodes; and a display control medium between the first electrode panel and the second electrode panel.

10 Claims, 8 Drawing Sheets

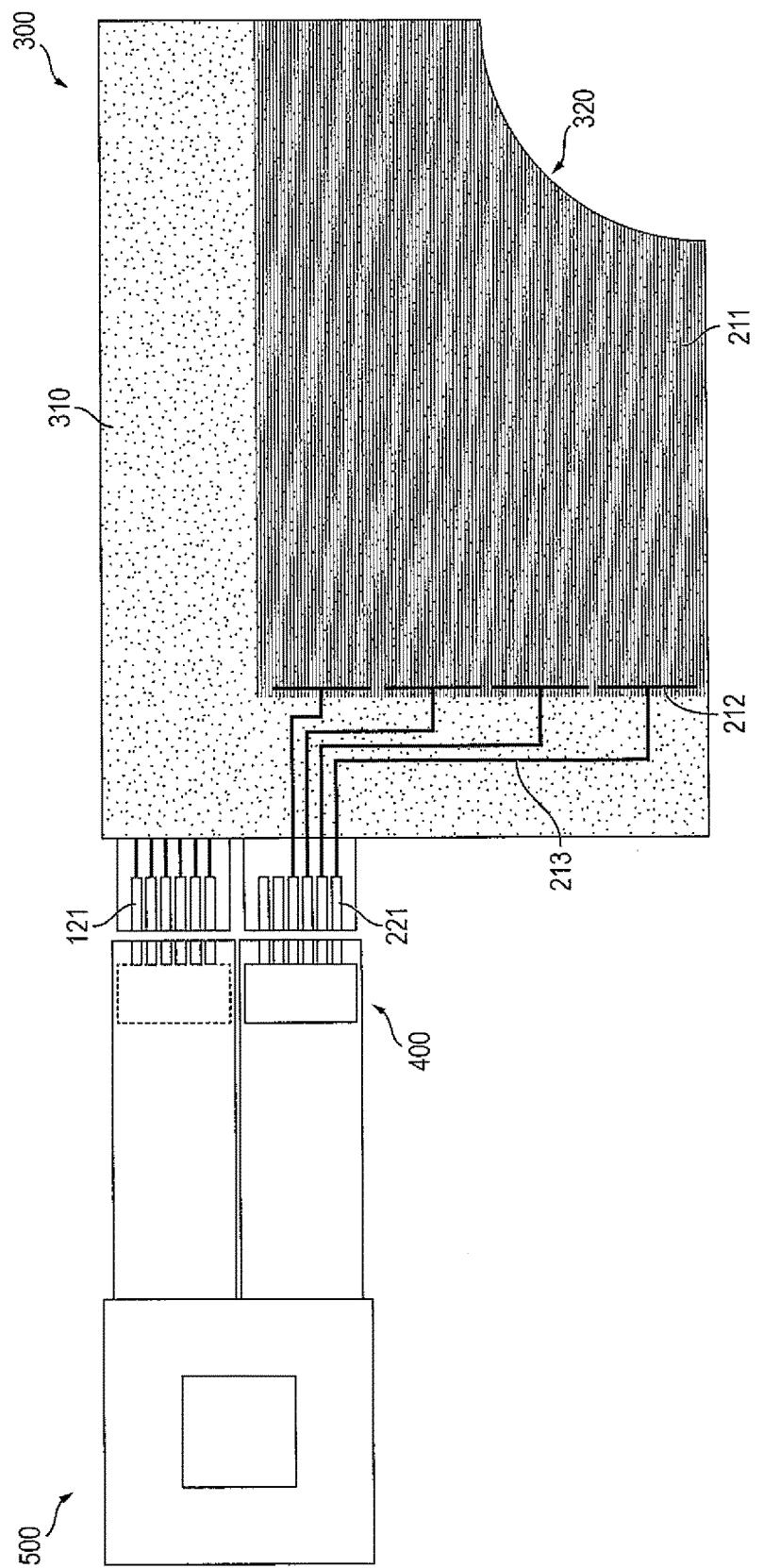

PASSIVE MATRIX DISPLAY DEVICE AND METHOD OF MAKING THE SAME

CROSS-REFERENCE TO RELATED APPLICATION(S)

The present application claims priority to and the benefit of U.S. Provisional Patent Application Ser. No. 62/031,778, entitled "METHOD TO CONSTRUCT CUSTOMIZABLE LOW-COST PASSIVE MATRIX DISPLAY DEVICE," filed in the United States Patent and Trademark Office on Jul. 31, 2014, the entire content of which is incorporated herein by reference.

BACKGROUND

1. Field

Embodiments of the present invention relate to a passive matrix display device and a method of making the same.

2. Related Art

Recently, display devices have been increasingly used as, for example, an output and/or a user interface for electronic devices, such as mobile phones, televisions, electronic watches, and other various personal electronic devices. Manufacturing such displays, including liquid crystal displays (LCDs), organic light emitting diode (OLED) displays, and the like, is relatively expensive. For example, a process including various specialized tooling and a carefully controlled environment may be used to manufacture the display devices. Furthermore, the specialized tooling may only be suitable to manufacture a display device having a certain size, and other tooling may be necessary to manufacture a display device having a different size.

Accordingly, prototype display devices (or display devices manufactured in relatively low quantities) are relatively expensive as specialized tooling may need to be manufactured or used to manufacture even a single prototype display. Furthermore, the relatively high cost of manufacturing prototype display devices means that hobbyists and the like cannot easily manufacture display devices for a specific application or project.

The above information disclosed in this Background section is only for enhancement of understanding of the background of the invention, and therefore, it may contain information that does not form prior art.

SUMMARY

Aspects of embodiments of the present invention include a passive matrix display device and a method of making the passive matrix display device.

According to an embodiment of the present invention, a passive matrix display device includes: a first electrode panel including a first substrate, a plurality of anisotropic conductive lines on the first substrate extending in a first direction, and a plurality of first electrodes, each of the first electrodes including some of the plurality of anisotropic conductive lines, and others of the plurality of anisotropic conductive lines being arranged between and contacting both adjacent ones of the first electrodes; a second electrode panel including a second substrate, a plurality of anisotropic conductive lines on the second substrate extending in a second direction crossing the first direction, and a plurality of second electrodes, each of the second electrodes including some of the plurality of anisotropic conductive lines, and others of the plurality of anisotropic conductive lines being arranged between and contacting both adjacent ones of the second electrodes; and a display control medium between the first electrode panel and the second electrode panel and configured to be varied by an electric field generated between the first electrodes and the second electrodes.

The anisotropic conductive lines may include carbon nanotubes.

The display control medium may include an electronic ink sheet.

The first electrode panel may further include a plurality of conductive traces at a first end of the anisotropic conductive lines and defining the first electrodes.

At least one of the plurality of conductive traces may have a different length than at least another one of the plurality of conductive traces.

The first electrode panel may further include another plurality of conductive traces at a second end of the anisotropic conductive lines.

Ones of the plurality of conductive traces may be aligned with corresponding ones of the other plurality of conductive traces.

The first electrode panel may further include a plurality of conductive lines and another plurality of conductive lines. Ones of the conductive lines may be connected to respective ones of the plurality of conductive traces, and ones of the other plurality of conductive lines may be connected to respective ones of the other plurality of conductive traces.

Each of the other plurality of conductive lines may extend along one side of the plurality of anisotropic conductive lines.

Some of the other plurality of conductive lines may extend along one side of the plurality of anisotropic conductive lines, and others of the other plurality of conductive lines may extend along an opposite side of the plurality of anisotropic conductive lines.

According to an embodiment of the present invention, a method of making a passive matrix display device includes: placing a plurality of anisotropic conductive lines on a first substrate extending in a first direction, the plurality of anisotropic conductive lines forming a continuous layer; placing a plurality of anisotropic conductive lines on a second substrate extending in a second direction crossing the first direction, the plurality of anisotropic conductive lines forming a continuous layer; and arranging a display control medium between the first substrate and the second substrate.

The providing the plurality of anisotropic conductive lines may include moving the first substrate with respect to a carbon nanotube ingot in the first direction, while the first substrate is in contact with the carbon nanotube ingot.

The method may further include forming a plurality of conductive traces at a first end of the anisotropic conductive lines to define a corresponding plurality of first electrodes, adjacent ones of the plurality of conductive traces being spaced from each other.

Some of the plurality of anisotropic conductive lines may be arranged between and may contact both adjacent ones of the plurality of first electrodes.

At least one of the plurality of conductive traces may have a length different from at least another one of the plurality of conductive traces.

The method may further include removing a portion of each of the first substrate, the second substrate, and the display control medium.

After the removing the portion of each of the first substrate, the second substrate, and the display control medium, the passive matrix display device may have a non-quadrangular shape.

According to an embodiment of the present invention, a passive matrix display device includes a first electrode panel, a second electrode panel, and a display control medium, and a method of making the passive matrix display device includes: forming a plurality of conductive traces on a first electrode panel, each of the plurality of conductive traces extending across a plurality of anisotropic conductive lines on the first electrode panel; forming a plurality of conductive traces on a second electrode panel, each of the plurality of conductive traces extending across a plurality of anisotropic conductive lines on the second electrode panel; and arranging a display control medium between the first electrode panel and the second electrode panel.

At least one of the plurality of conductive traces may have a length that is different from another one of the plurality of conductive traces.

The method may further include removing a portion of the first electrode panel, the second electrode panel, and the display control medium such that the passive matrix display device has a non-quadrangular shape.

Accordingly, a relatively low-cost, easily customizable passive matrix display device and a method of making the same is provided.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings, in which:

FIG. 7 illustrates an assembled display panel and a controller according to an embodiment of the present invention.

DETAILED DESCRIPTION

Figure 1:
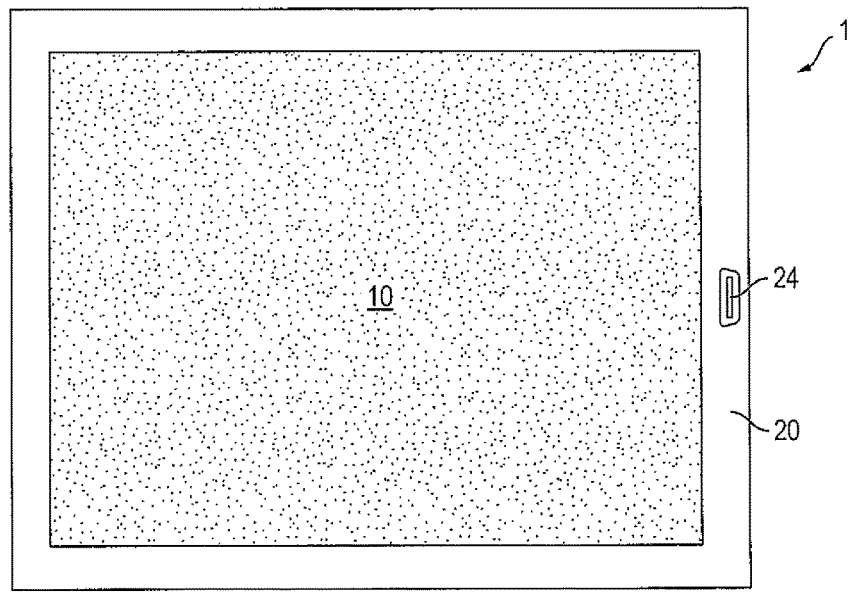
FIG. 1 illustrates a display device according to an embodiment of the present invention.

Hereinafter, example embodiments of the present invention will be described in more detail with reference to the accompanying drawings. The present invention, however, may be embodied in various different forms and should not be construed as being limited to only the embodiments illustrated herein. Rather, these embodiments are provided as examples so that this disclosure will be thorough and complete and will fully convey some of the aspects and features of the present invention to those skilled in the art. Accordingly, processes, elements, and techniques that are not necessary for those having ordinary skill in the art to have a complete understanding of the aspects and features of the present invention may not be described with respect to some of the embodiments of the present invention. Unless otherwise noted, like reference numerals denote like elements throughout the attached drawings and the written description, and thus, descriptions thereof may not be repeated. In the drawings, the relative sizes of elements, layers, and regions may be exaggerated for clarity.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section described below could be termed a second element, component, region, layer, or section without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when an element or layer is referred to as being "between" two elements or layers, it can be the only element or layer between the two elements or layers or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions, such as "at least one of," when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration.

It will be understood that when an element or layer is referred to as being "on," "connected to," "coupled to," or "adjacent to" another element or layer, it can be directly on, connected to, coupled to, or adjacent to the other element or layer, or one or more intervening elements or layers may be present. However, when an element or layer is referred to as being "directly on," "directly connected to," "directly coupled to," or "immediately adjacent to" another element or layer, there are no intervening elements or layers present.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification and should not be interpreted in an idealized or overly formal sense, unless expressly so defined herein.

The controller and/or any other relevant devices or components according to embodiments of the present invention described herein may be implemented utilizing any suitable hardware, firmware (e.g., an application-specific integrated circuit), software, or a suitable combination of software, firmware, and hardware. For example, the various components of the controller may be formed on one integrated circuit (IC) chip or on separate IC chips. Further, the various components of the controller may be implemented on a flexible printed circuit film, a tape carrier package (TCP), a printed circuit board (PCB), or formed on a same substrate as the controller. Further, the various components of the controller may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the example embodiments of the present invention.

According to embodiments of the present invention, a relatively low-cost, easily customizable passive matrix display device and a method of making the same is provided. The passive matrix display device can be used as an output for an electronic device. For example, the passive matrix display device can be used as a prototype display for an electronic device, a display for a small-quantity run of electronic devices, or anywhere a passive matrix display device may be used. In addition, the passive matrix display device may be flexible by using flexible substrates therein. Furthermore, a touch screen panel can be implemented along with the passive matrix display device, thus providing a relatively low-cost, easily customizable user input device.

The passive matrix display device may be formed using carbon nanotubes as the electrodes. Carbon nanotubes have anisotropic conductivity (e.g., are anisotropically conductive), meaning that the carbon nanotubes conduct electricity (electrons) along their length (e.g., along a long axis of the nanotube) approximately 100 times better than they conduct electricity (electrons) in a direction perpendicular to their length (e.g., across a width or diameter of the nanotube). Accordingly, when forming the electrodes using carbon nanotubes, adequate spacing between adjacent ones of the plurality of electrics and adjacent ones of the plurality of the carbon nanotubes does not need to be ensured (e.g., adjacent carbon nanotubes may contact each other) due to their anisotropic conductivity. For example, the carbon nanotubes may be layered on each other or may be formed in a continuous layer on a substrate without transmitting or transferring an appreciable amount of electric current between each other (e.g., without demonstrating any appreciable crosstalk therebetween).

Conventional electrodes, formed of compounds such as ITO (indium tin oxide) and the like, are generally equally or substantially equally conductive along both their width and length directions. Accordingly, when using these compounds, such as ITO, to form the electrodes, the various electrodes should be spaced from each other (e.g., spaced apart from each other) so that they do not transmit electric current between each other (e.g., to prevent crosstalk therebetween). Due to this spacing, the forming of ITO electrodes is relatively expensive as specialized tooling is generally used to ensure adequate spacing between the various electrodes. Furthermore, the cost of ITO, for example, is increasing as indium, a rare earth metal, becomes more expensive.

Accordingly, the passive matrix display device according to embodiments of the present invention may be quickly and easily manufactured without the use of specialized tooling.

Referring to FIG. 1, a display 1 includes a display panel 10, a bezel 20, and an input connector 24. According to an embodiment of the present invention, the display panel 10 is a passive matrix display device and may be an electronic ink display, a liquid crystal display, or the like. The input connector 24 may be any suitable connector, for example, a VGA input, an HDMI input, a USB input, or the like. The bezel 20 may be provided around a periphery of the display panel 10 to cover ancillary components, such as a controller, power supply, and the like.

The display panel 10 includes a first electrode panel 100 (see FIG. 2), a second electrode panel 200 (see FIG. 3), and a suitable display medium (e.g., a suitable display control medium) therebetween. As will be further described later, the display medium (or display control medium) may be an electronic ink sheet, a liquid crystal layer, or the like.

Figure 2:
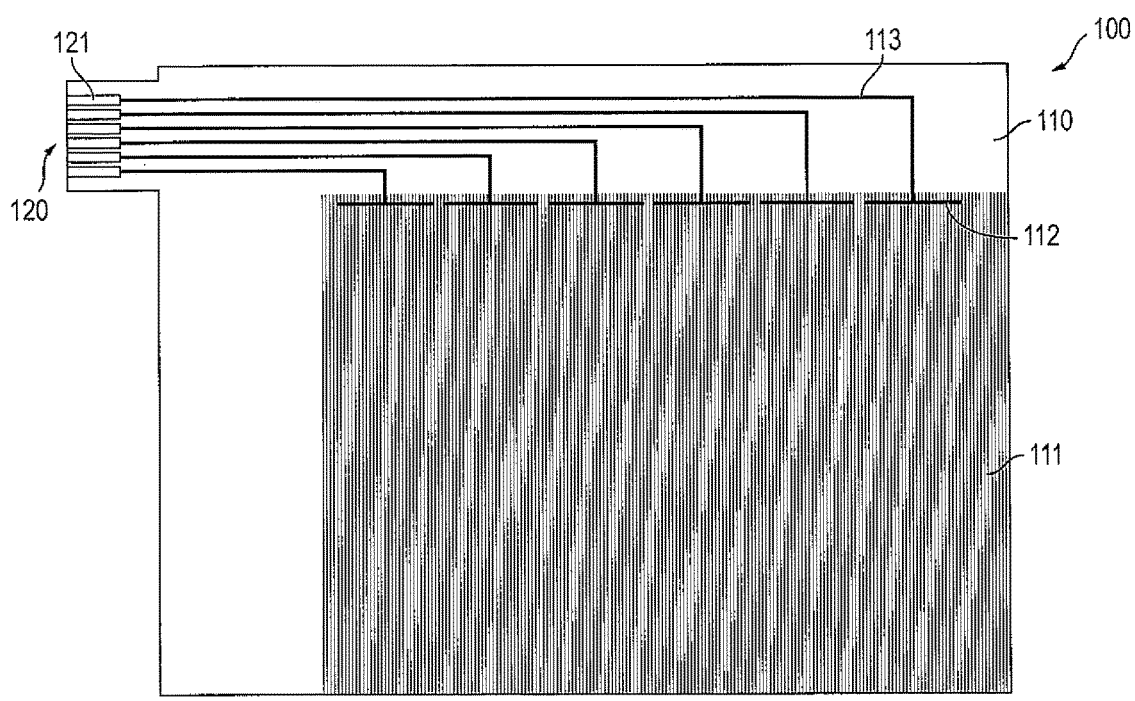
FIG. 2 illustrates a first electrode panel of the display device according to an embodiment of the present invention.

Referring to FIG. 2, the first electrode panel 100 (e.g., a front electrode panel) according to an embodiment of the present invention includes a substrate 110 (e.g., a first substrate) and a plurality of conductive elements 111 (e.g., anisotropic conductive elements or lines) extending in a column direction, a plurality of conductive traces 112 extending perpendicular to and across ends (e.g., across portions adjacent ends) of the conductive elements 111, a plurality of conductive lines 113, and a plurality of connector pads 121 on the substrate 110. The substrate 110 may have a connector portion 120 on which the connector pads 121 are formed. The connector portion 120 may protrude from an edge of the substrate 110, but the present invention is not limited thereto. For example, the connector portion 120 may be an edge portion of the substrate 110 that does not protrude therefrom.

The substrate 110 may be made of, for example, plastic, glass, or any other suitable material. The substrate 110 may be transparent, opaque, or translucent. The substrate 110 may be flexible.

The conductive elements 111 may be transparent and/or may be formed small enough such that they are not visible (e.g., are virtually invisible) to a viewer. For example, the conductive elements 111 may not substantially interfere with a displayed image. The conductive elements 111 may be, for example, carbon nanotubes, silver and/or copper nanowires, a copper mesh patterned into strips, and/or the like. Any material that demonstrates anisotropic conductivity may be a suitable electrode. In one example, a material that exhibits less than 1% crosstalk may be a suitable electrode. When the conductive elements 111 are carbon nanotubes, the conductive elements 111 may extend generally in a column direction and may have some local variations in their respective extension direction. For example, as is illustrated in FIG. 8b, the carbon nanotubes may be wavy or slightly bent or curved along their length. However, this waviness or bending will not substantially affect performance of the display and may prevent or reduce generation of a moiré pattern. Also, because carbon nanotubes are anisotropically conductive, various carbon nanotubes may contact each other without substantially affecting the performance of the display as there is relatively little crosstalk therebetween (e.g., less than 1% crosstalk) even when the carbon nanotubes contact each other. For example, the carbon nanotubes forming one electrode may contact other carbon nanotubes forming another electrode, or other carbon nanotubes not forming an electrode may contact adjacent carbon nanotubes that do form electrodes without substantially affecting the performance of the display device.

When the conductive elements 111 are silver and/or copper nanowires or copper strips, each of the conductive elements 111 may be spaced from adjacent conductive elements 111 to reduce or prevent crosstalk therebetween. However, if the nanowires used as the conductive elements 111 are sufficiently anisotropically conductive, the various nanowires or strips may contact each other without significantly affecting the performance of the display device as described above with respect to the carbon nanotubes.

The conductive traces 112 are each connected to a plurality of the conductive elements 111 to define electrodes (e.g., first electrodes) of the first electrode panel 100. For example, a first conductive trace 112 is connected to (e.g., contacts or extends across) a first group of the conductive elements 111 to define an electrode, a second conductive trace 112 is connected to a second group of the conductive elements 111 to define another electrode, etc. As will be further described later, a length of each of the conductive traces 112 determines a width of each pixel aligned with that respective column. The length of each of the conductive traces 112 may vary (e.g., the length of various ones of the conductive traces 112 may be different from each other). For example, the length of the conductive traces 112 near an edge of the substrate 110 may be greater than a length of the conductive traces 112 near a center of the substrate 110, but the present invention is not limited thereto.

Adjacent ones of the conductive traces 112 may be spaced from each other (e.g., spaced apart from each other). However, one or more conductive elements 111 may be between adjacent conductive traces 112 and between the conductive elements 111 that form the various electrodes. Thus, the various electrodes may contact each other through ones of the conductive elements 111 between the adjacent electrodes (e.g., conductive elements 111 that do not form an electrode may be between and may contact adjacent electrodes). However, because the conductive elements 111 are anisotropically conductive as described above, electric transmission or transmittance between adjacent electrodes is minimal or is prevented altogether. Accordingly, the first electrode panel may be easily manufactured without regard as to the presence of conductive elements 111 arranged between and/or connecting adjacent electrodes.

The conductive lines 113 extend between and electrically connect corresponding ones of the conductive traces 112 to corresponding ones of the connector pads 121. The conductive lines 113 permit a driving signal transmitted from a controller to be sent to respective ones of the conductive traces 112 to energize the corresponding electrodes (e.g., the corresponding conductive elements 111).

The conductive traces 112, the conductive lines 113, and the connector pads 121 may each be formed of the same material or may be formed of different materials. For example, these components may be formed of a conductive ink including, for example, silver, copper, or any suitable material. The conductive traces 112 and the conductive lines 113 may be printed using, for example, an inkjet printer, or drawn using a pen dispenser. Thus, the conductive traces 112 and the conductive lines 113 may be easily customized by, for example, varying a length thereof or connection structure therebetween according to the specific display that is desired without requiring specialized tooling. The connector pads 121 may be pre-formed on the substrate 110 to correspond to a connector extending from the controller or may be printed or drawn similar to the conductive traces 112 and the conductive lines 113 to be easily customized.

Figure 3:
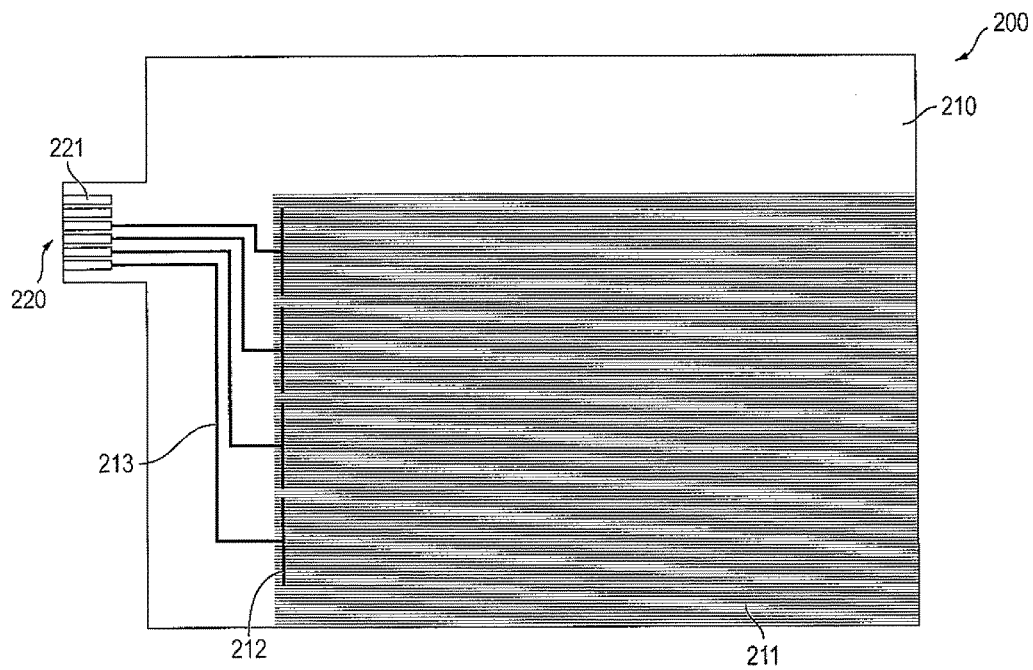
FIG. 3 illustrates a second electrode panel of the display device according to an embodiment of the present invention.

Referring to FIG. 3, the second electrode panel 200 (e.g., a rear electrode panel) according to an embodiment of the present invention includes a substrate 210 and a plurality of conductive elements 211 (e.g., anisotropic conductive elements or lines) extending in a row direction crossing the column direction, a plurality of conductive traces 212, a plurality of conductive lines 213, and a plurality of connector pads 221 on the substrate 210. The connector pads 221 may be formed on a connector portion 220 of the substrate 210 which may protrude from an edge of the substrate 210; however, the present invention is not limited thereto, and the connector portion 220 may be an edge portion of the substrate 210 that does not protrude therefrom.

The conductive elements 211 may be the same or substantially the same as the conductive elements 111 described above with respect to FIG. 1, except the conductive elements 211 extend in the row direction crossing the column direction. However, the present invention is not limited thereto, and the conductive elements 211 may extend in any direction, for example, 45° with respect to the extension direction of the conductive elements 111.

The conductive traces 212, the conductive lines 213, and the connector pads 221 may substantially correspond to the conductive traces 112, the conductive lines 113, and the connector pads 121, respectively, described above with reference to FIG. 2. Thus, a detailed description of these components may be omitted.

A body portion of the substrate 110 (e.g., a portion of the substrate 110 other than the protruding connector portion 120) and a body portion of the substrate 210 (e.g., a portion of the substrate 210 other than the protruding connector portion 220) may have the same or substantially the same size. Furthermore, the connector portion 120 and the connector portion 220 may protrude from different areas of the body of the substrate 110 and the body of the substrate 210, respectively, such that when the substrates 110 and 210 are aligned with each other (e.g., stacked on each other) the connector portions 120 and 220 do not overlap with each other. Furthermore, portions of the substrates 110 and 210 on which the conductive elements 111 and 211 are respectively formed may overlap when the substrates 110 and 210 are aligned.

The substrate 210 may be transparent or opaque. However, at least one of the first or second substrate 110 or 210 is transparent to allow a displayed image to be transmitted therethrough and be visible to a viewer.

Figure 4:
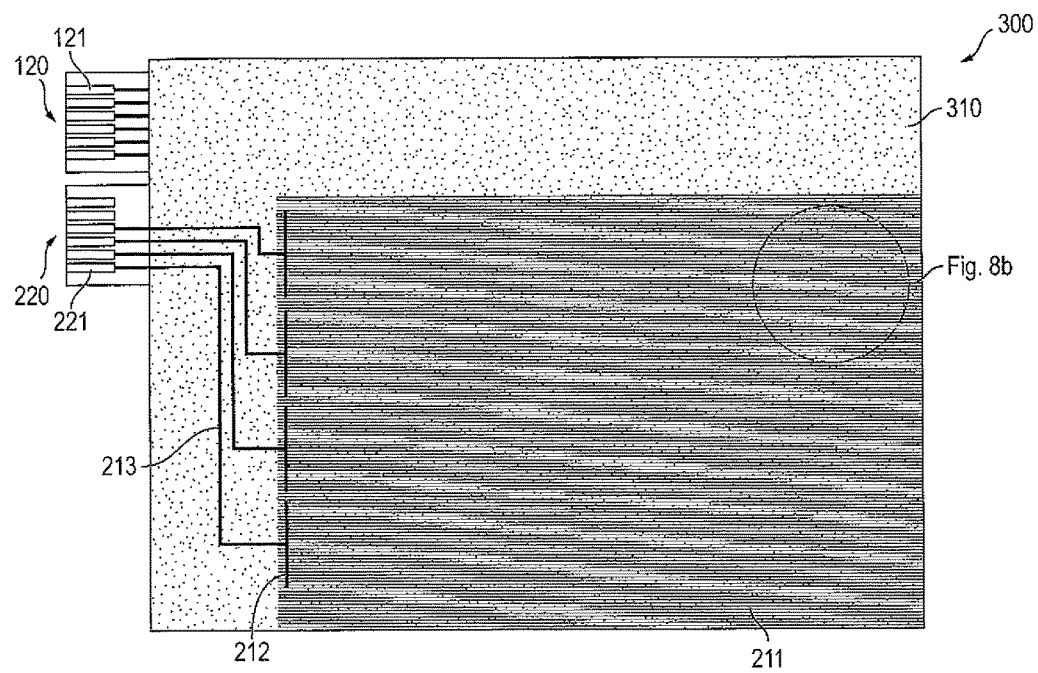
FIG. 4 illustrates an assembled display panel according to an embodiment of the present invention.
Figure 8A:
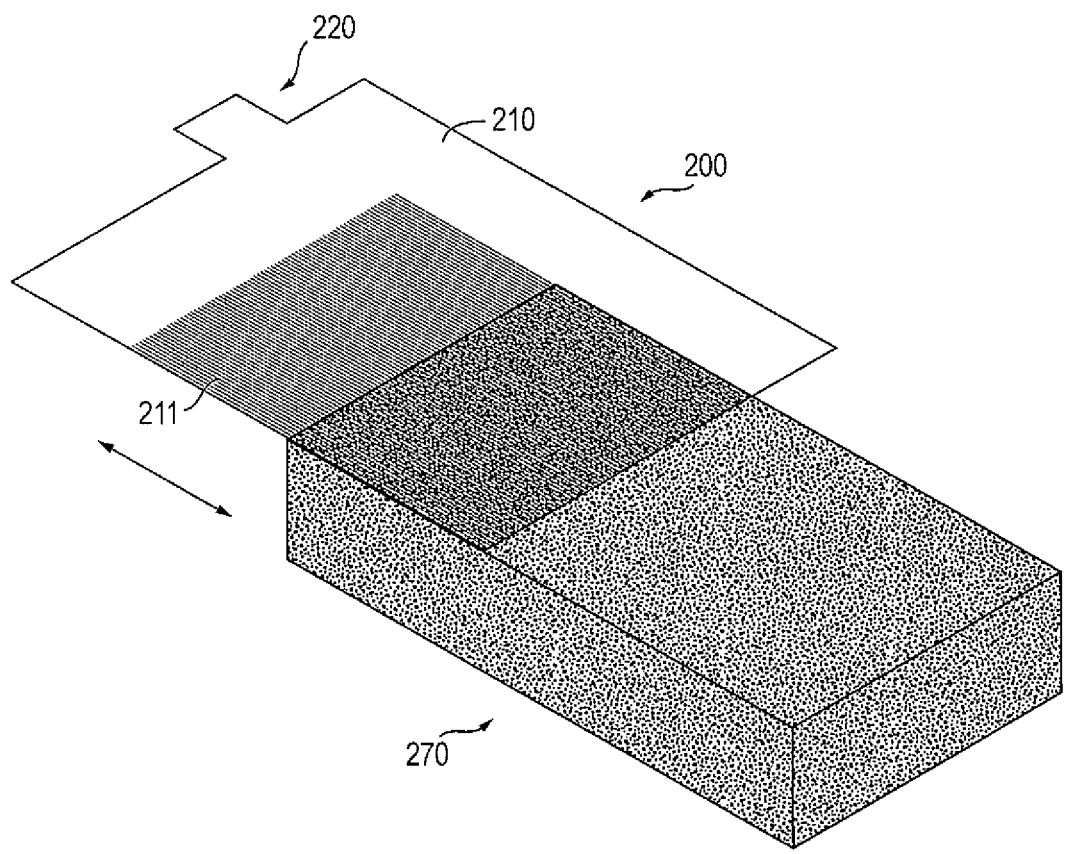
FIGS. 8a-8g illustrate a method of making a passive matrix display device according to an embodiment of the present invention.
Figure 8B:
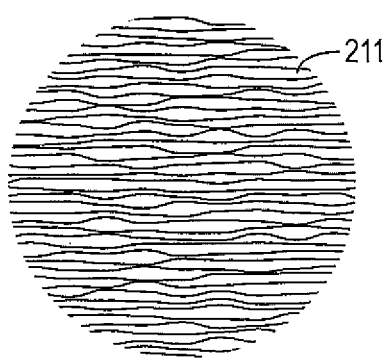
Figure 8C:
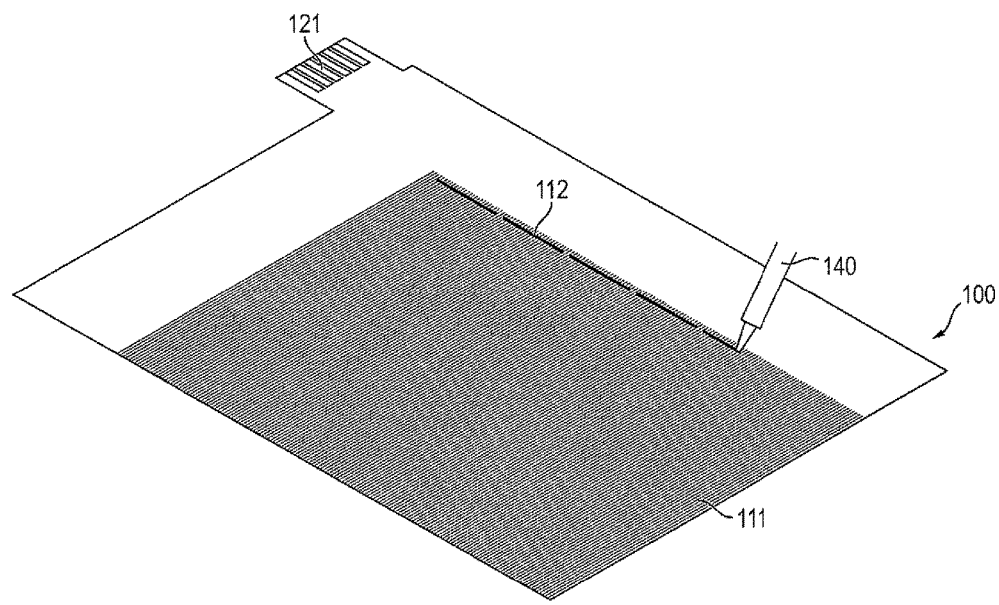
Figure 8D:
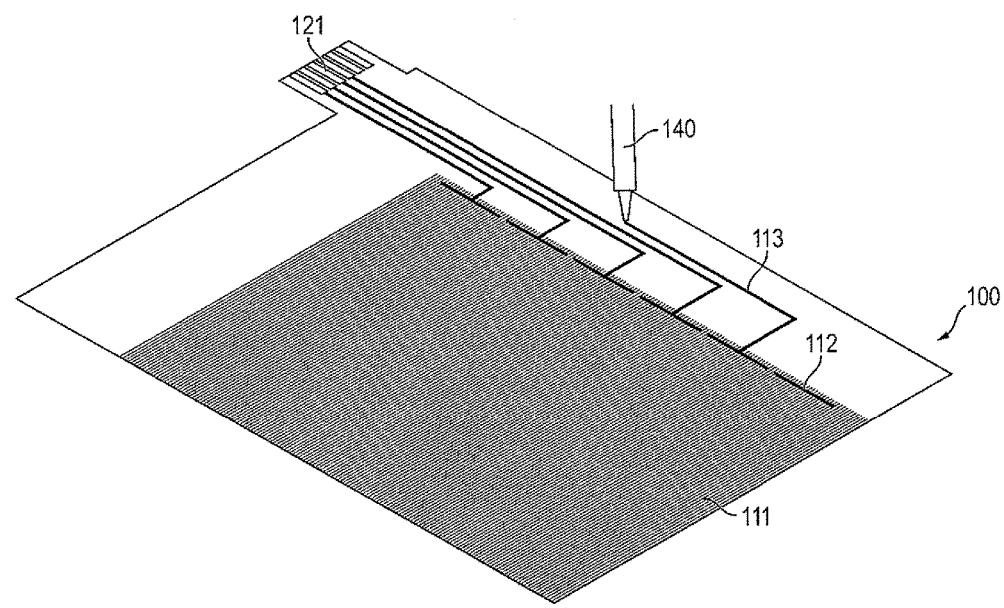
Figure 8E:
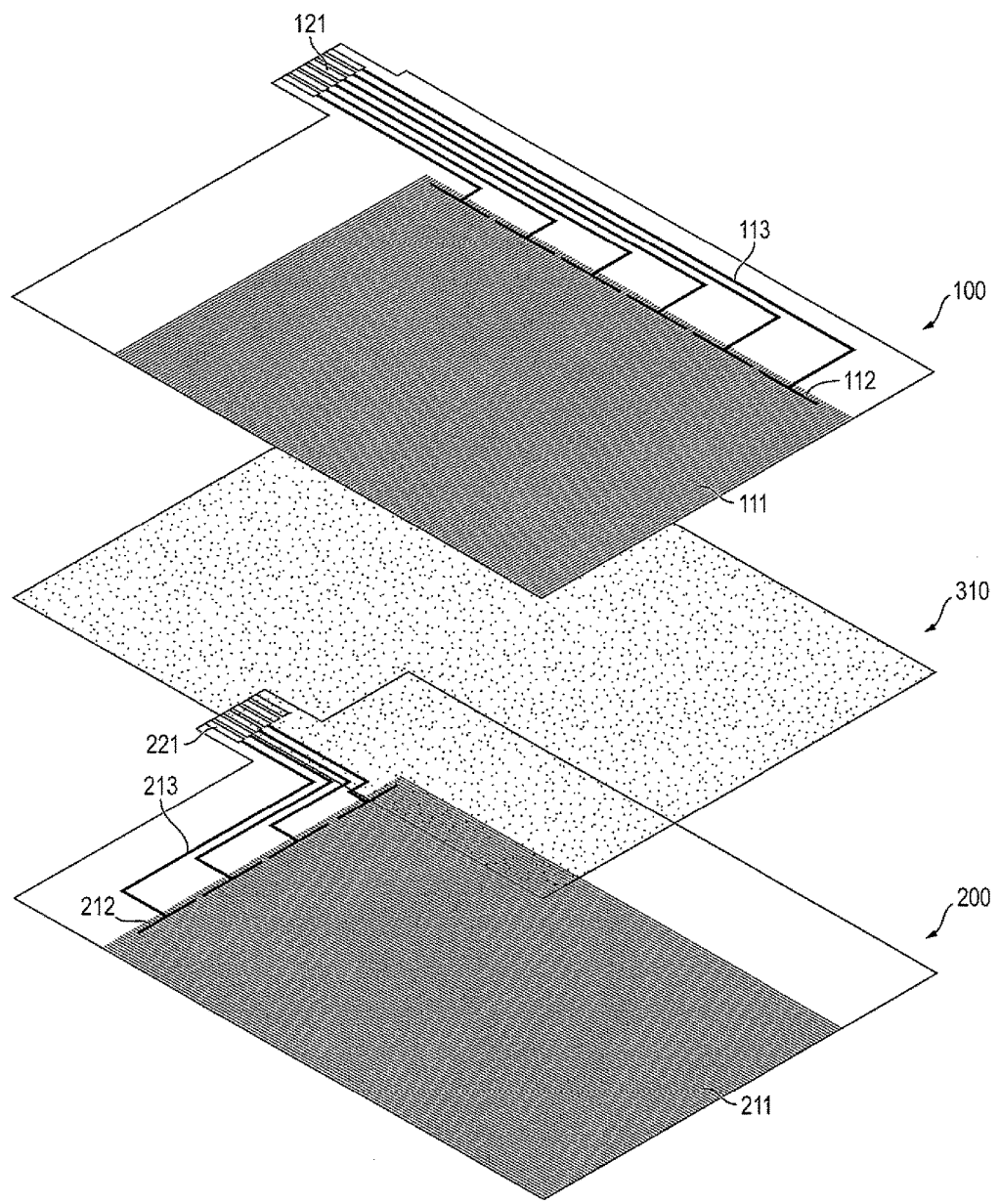

Referring to FIG. 4, an assembled display panel 300 according to an embodiment of the present invention includes the first electrode panel 100 and the second electrode panel 200 with a display medium 310 (e.g., a display control medium) therebetween (see FIG. 8e). In FIG. 4, the individual components of the second electrode panel 200 are illustrated merely for convenience of explanation and would not be visible (e.g., would be virtually invisible) to a viewer viewing the assembled display panel 300. For example, the conductive elements 211 of the second electrode panel 200 would not substantially interfere with a displayed image. Furthermore, the first electrode panel 100 and the second electrode panel 200 may be arranged such that respective sides of the first and second electrode panels 100 and 200 on which the conductive elements 111 and 211 are respectively formed face the display medium 310.

The display medium 310 may be an electronic ink sheet, a liquid crystal layer, or any other suitable medium. Furthermore, the conductive elements 111 extending in the column direction and the conductive elements 211 extending in the row direction form a matrix arrangement. For example, the groups of the conductive elements 111 formed by the conductive traces 112 (e.g., the first electrodes) cross the groups of the conductive elements 211 formed by the conductive traces 212 (e.g., the second electrodes).

Hereinafter, a driving method of the assembled display panel 300 according to an embodiment of the present invention will be described. As described above, the groups of the conductive elements 111 and 211 (e.g., the first electrodes and the second electrodes, respectively) are arranged in a matrix. The controller sends electrical signals (e.g., applies voltages) to various connector pads 121 and 221. The electrical signals are transmitted through the corresponding conductive lines 113 to the corresponding conductive traces 112 and through the corresponding conductive lines 213 to the corresponding conductive traces 212. Then, the electrical signals are conducted along the corresponding groups of the conductive elements 111 (e.g., along the corresponding first electrodes) and along the corresponding groups of the conductive elements 211 (e.g., along the corresponding second electrodes). When one group of the conductive elements 111 is energized (e.g., receive the signal from the controller) and one group of the conductive elements 211 is energized at a different level or voltage, an electric field is generated where the groups of the conductive elements 111 and 211 cross each other. The display medium 310 may be changed at where the electric field is created.

For example, when the display medium 310 is an electronic ink sheet, the electronic ink particles may be arranged within microcapsules to express either a dark or light color (e.g., express either black or white color) according to the direction of the applied electric field (e.g., according to how the conductive elements 111 and the conductive elements 211 are energized).

As another example, when the display medium 310 is the liquid crystal layer, the applied electric field acts on liquid crystals in the liquid crystal layer to selectively allow light (e.g., light emitted from a backlight) to pass therethrough, thus displaying an image. In addition, when the display medium 310 is the liquid crystal layer, a polarizer may be additionally included over the assembled display panel 300. However, the present invention is not limited to the above display mediums, and any suitable display medium may be included in the assembled display panel 300.

Furthermore, because the various conductive traces 112 and 212 may be formed to have varying lengths, the assembled display panel 300 may have a custom and/or varying dot pitch at different regions thereof. For example, the dot pitch of the assembled display panel 300 at a center thereof may be less than the dot pitch at a periphery thereof.

In one example, when a touch screen panel is included on the assembled display panel 300, a dot pitch at a bottom edge (e.g., a bottom periphery) of the assembled display panel 300 may be relatively large as visual indicators (e.g., buttons) may be displayed there that correspond to portions of the touch panel so a user may interact with the assembled display panel 300. A relatively large dot pitch may be used in this area to simplify a driving method of the assembled display panel 300 by reducing the number of groups of conductive elements 111 and 211 in the display without substantially affecting the quality of the display.

Figure 5:
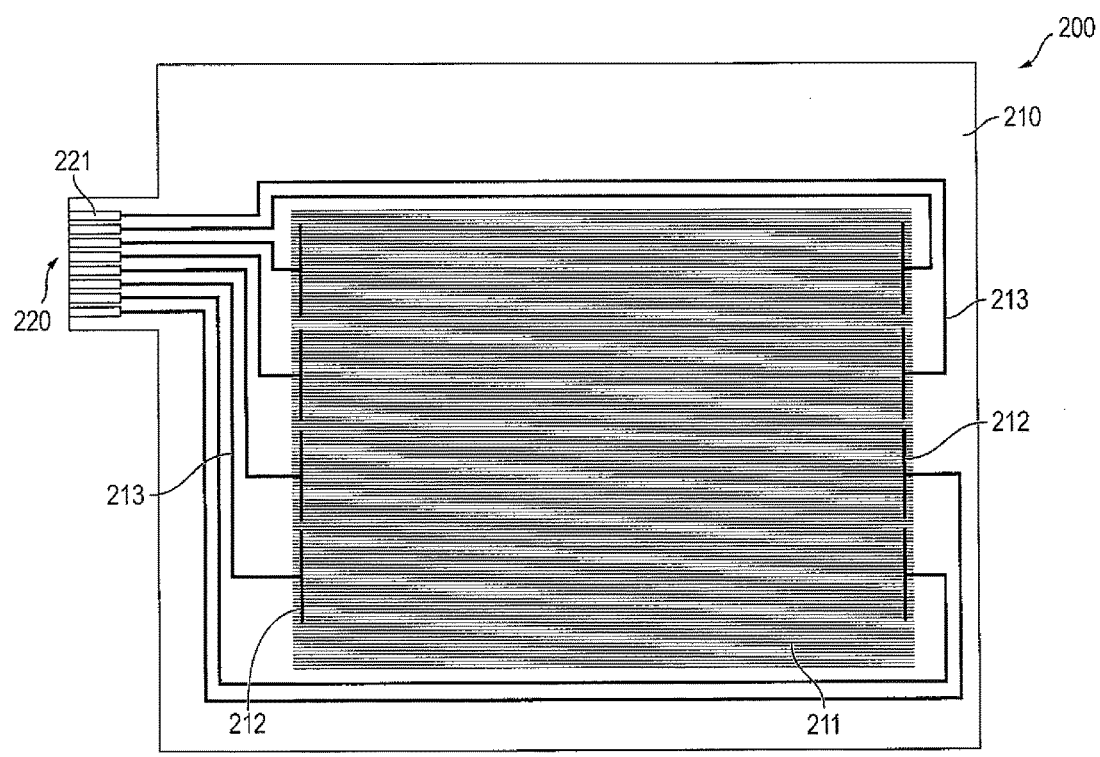
FIG. 5 illustrates a second electrode panel of the display device according to an embodiment of the present invention.

Referring to FIG. 5, the second electrode panel 200 according to another embodiment of the present invention includes another plurality of conductive traces 212 and corresponding conductive lines 213. The other plurality of conductive traces 212 are at an opposite end of the conductive elements 211 and are aligned with ones of the plurality of conductive traces 212 at a first end (e.g., the end adjacent the connector portion 220) of the conductive elements 211. Furthermore, some of the additional conductive lines 213 may extend along one side of the conductive elements 211 and others of the additional conductive lines 213 may along an opposite side of the conductive elements 211 to be connected to the connector pads 221. In another embodiment, the additional conductive lines 213 may each extend along one side of the conductive elements 211 to be connected to the connector pads 221. The arrangement of the additional conductive lines 213 may be determined according to a desired final shape of the assembled display. For example, if a bottom right corner of the assembled display is desired to be shaped, the additional conductive lines 213 may extend along an upper side of the conductive elements 211 to be connected to the connector pads 221 so as to be not be cut when the assembled device is formed or shaped.

Similar to the second electrode panel 200 illustrated in FIG. 5, the first electrode panel 100 may include additional conductive traces 112 and conductive lines 113. However, because their structure is the same or substantially the same as that of the second electrode panel 200 shown in FIG. 5, a detailed description thereof may be omitted.

Furthermore, the additional conductive lines 213 may be connected to separate connector pads 221 or may be connected to corresponding ones of the conductive lines 213. For example, one of the conductive lines 213 connected to one of the conductive traces 212 may be connected to or formed integrally with another one of the conductive lines 213 that is connected to the conductive trace 212 that is aligned with the one conductive trace 212, thus reducing the number of connector pads 221 and allowing the display to be more easily driven.

The additional conductive traces 212 may allow the electrical signals to be more evenly applied to the electrodes, thus reducing or preventing degradation of a display image along a length and/or width of the display. Furthermore, the additional conductive traces allow an opening (e.g., a hole) or the like to be formed or cut in the assembled display panel 300 without affecting the display. For example, because a voltage is applied to both ends of the conductive elements 111 and 211, respectively, even if individual conductive elements 111 and 211 are cut or severed along their length, the voltage is still applied to each end of the conductive elements 111 or 211 via the additional conductive traces 112 and 212, respectively.

Figure 6:
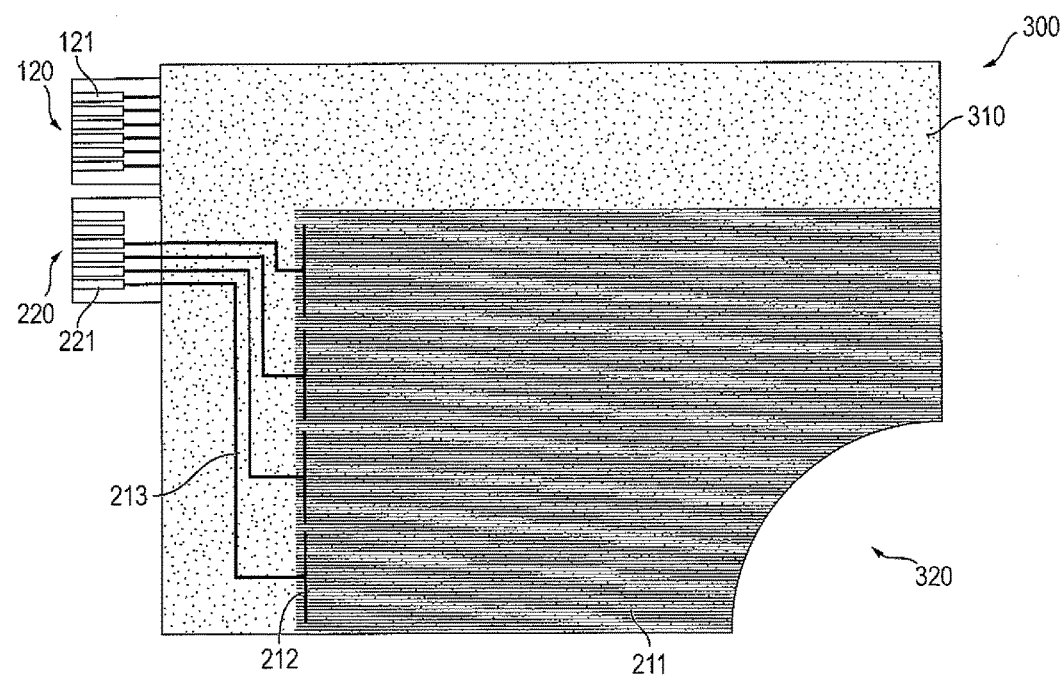
FIG. 6 illustrates an assembled display panel according to an embodiment of the present invention.

Referring to FIG. 6, the assembled display panel 300 may be customized (e.g., made to have a certain desired shape) by a user. For example, the user may form (e.g., shape or cut) the assembled display panel 300 using scissors, a knife, a laser, or the like to cut through the first electrode panel 100, the display medium 310, and the second electrode panel 200. In one example, when the desired dimensions of the assembled display panel 300 are not known until after completion of the assembled display panel 300, the assembled display may be easily cut or shaped to have the desired dimensions without affect the quality of the display. In another example, the assembled display panel 300 may be shaped to have a cut corner 320 (e.g., an inwardly rounded corner); however; the present invention is not limited thereto, and the assembled display panel 300 may be formed or shaped to have any suitable shape.

Referring to FIG. 7, the assembled display panel 300 may be connected to a controller 500 via a connector 400. The controller 500 may be connected to the input connector 24 (see FIG. 1) to receive information from an external device or input. The controller 500 may convert the received information into a suitable format to respectively control the various conductive elements 111 and 211 (e.g., apply signals to the conductive elements 111 and 211, respectively) to display an input image. The controller 500 may be set to refresh the assembled display panel 300 at a rate, for example, 60 Hz or 120 Hz or at any suitable rate.

The connector 400 may connect the controller 500 to the assembled display panel 300 (e.g., to the first electrode panel 100 and the second electrode panel 200) via the connector portions 120 and 220. For example, the connector 400 may have pads that contact (e.g., connect to) the various connector pads 121 and 221. The connector 400 may be fixed to (e.g., soldered to) the connector portions 120 and 220 or may be removably connected to the connector portions 120 and 220 by, for example, a friction lock between the connector 400 and the connector portions 120 and 220. However, the present invention is not limited thereto, and any suitable connection structure may be used between the controller 500 and the assembled display panel 300.

Referring to FIGS. 8*a*-8*g*, a method of manufacturing a passive matrix display device according to an embodiment of the present invention will be described. Throughout the following description, a method of manufacturing one of the electrode panels is described for convenience. A description of a method of manufacturing the other of the electrode panels may be omitted as the method is the same or substantially similar to the method of manufacturing the one of the electrode panels except as specifically noted.

Referring to FIG. 8*a*, the substrate 210 is moved over (e.g., dragged over) a carbon nanotube ingot 270. For example, the substrate 210, formed of, for example, plastic or glass, is placed on the carbon nanotube ingot 270, pressure is applied to the substrate 210 in a direction toward the ingot 270, and the substrate 210 and/or the ingot 270 is then moved in the direction along which the resulting carbon nanotubes are desired to extend (e.g., the column direction or the row direction). As shown in FIG. 8*a*, the carbon nanotubes extend in the row direction of the substrate 210, and the substrate 210 and/or the ingot 270 are moved in the direction indicated by the arrow. After the carbon nanotubes are on the substrate 210, the process is similarly performed on another substrate, except the other substrate and/the ingot is moved to provide carbon nanotubes in a column direction (or any other suitable direction) on the other substrate. The carbon nanotubes thus form the conductive elements 111 and 211 as described above.

The connector pads 221 may be formed on the substrate 210 prior to placing of the conductive elements 211 thereon, or the connector pads 221 may be formed on the substrate 210 after the conductive elements 211 are placed thereon.

Because the carbon nanotubes are anisotropically conductive, they can be quickly and easily provided to the substrate without regard to spacing therebetween or precise orientation. As shown in FIG. 8*b*, the carbon nanotubes may not extend exactly along the column or row direction but may have local variations (e.g., may be wavy, curved, or bent). However, these local variations do not negatively affect performance of the display. As described above, the conductive elements 111 and 211 are not limited to the carbon nanotubes but may be formed of silver and/or copper nanowires or a copper mesh that is patterned into strips or lines using methods known to those skilled in the art.

Referring to FIG. 8*c*, a dispenser 140 is used to apply the conductive traces 112 at one end of the conductive elements 111. The dispenser 140 may be a conductive ink pen, an inkjet printer nozzle, and/or the like. Furthermore, the dispenser 140 may be selectively controlled to form the conductive traces 112 having certain lengths. For example, the conductive traces 112 may have different lengths from each other to produce a desired dot pitch in the assembled display panel 300.

Referring to FIG. 8*d*, the dispenser 140 may be used to form the conductive lines 113 which connect ones of the conductive traces 112 to respective ones of the connector pads 121. The same material that forms the conductive traces 112 may form the conductive lines 113 or a different material may be used. Further, the same dispenser 140 that is used to form the conductive traces 112 may be used to form the conductive lines 113 or a different dispenser may be used. For example, an inkjet printer may be used to form the conductive traces 112 and a conductive pen may be used to form the conductive lines 113 or vice versa.

Referring to FIG. 8*e*, once the first electrode panel 100 and the second electrode panel 200 are formed as described above, the display medium 310 is arranged between the first electrode panel 100 and the second electrode panel 200. The first and second electrode panels 100 and 200 are arranged such that the conductive elements 111 and 211 respectively face toward the display medium 310. The first electrode panel 100, the display medium 310, and the second electrode panel 200 may then be joined together to form the assembled display panel 300 (see FIG. 8*f*).

Figure 8F:
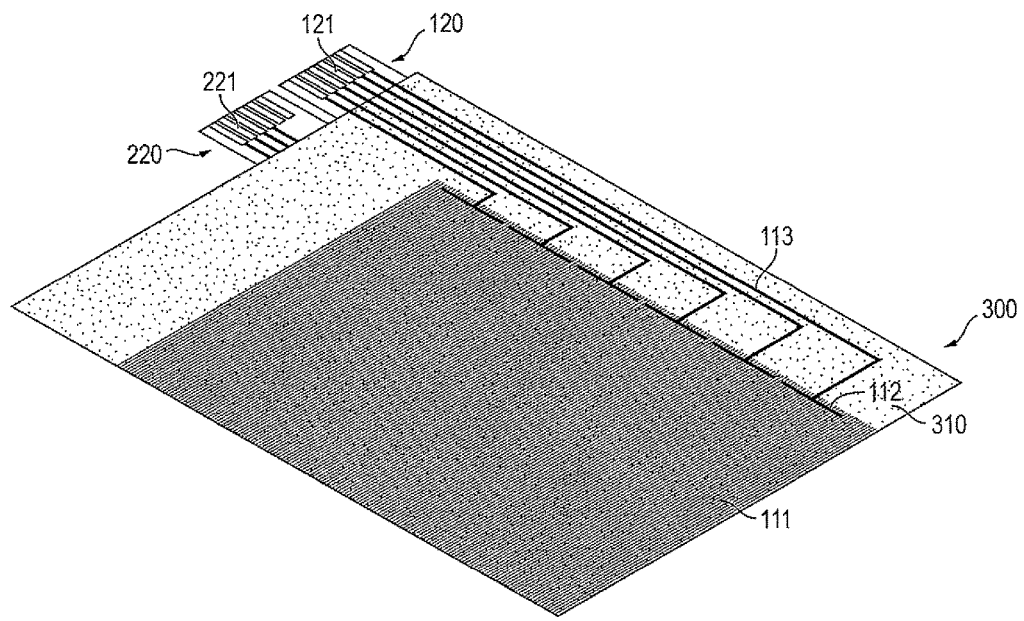

Referring to FIG. 8*f*, a sealant may be provided along an outer periphery of the assembled display panel 300 to join these components together and seal these components from the elements, such as moisture and oxygen. Alternatively, if further shaping or forming of the assembled display panel 300 is desired, the sealant may be applied after the further shaping or forming of the assembled display panel 300 is completed.

Figure 8G:
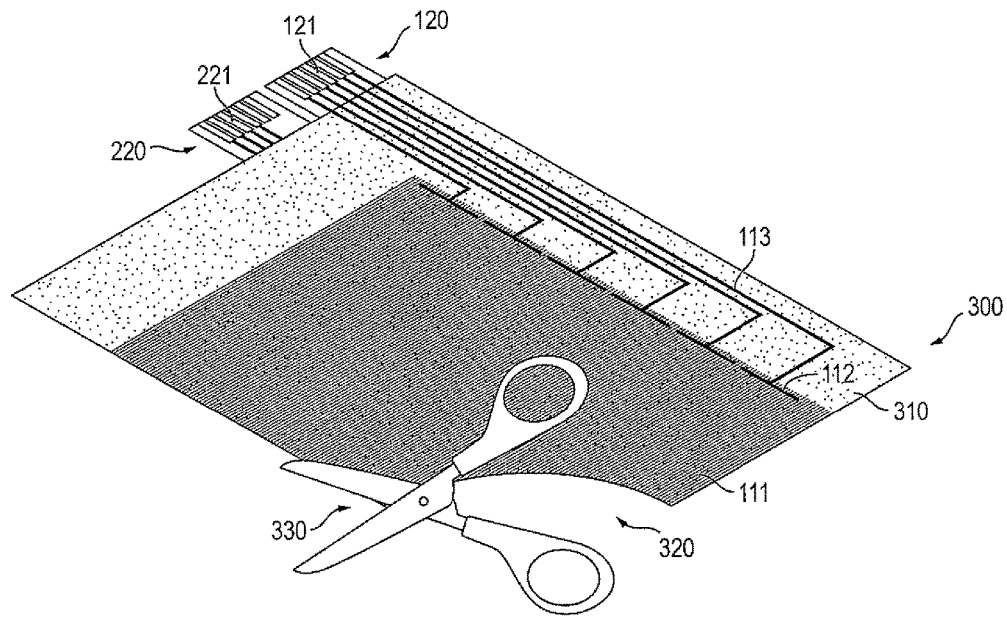

Referring to FIG. 8*g*, if desired, the assembled display panel 300 may be shaped or formed by using any suitable cutting device that can penetrate the substrates and the display medium, such as scissors 330, a knife, a laser, and/or the like. Any suitable shape can be formed in the assembled display panel 300, such as an inwardly rounded corner 320. In another example, the overall dimensions of the display may be reduced while maintaining an aspect ratio, such as 4:3, 16:9, or 16:10. In yet another embodiment, as described above, when the conductive traces 112 and 212 are formed at opposite ends of the conductive elements 111 and 211, respectively, shapes may be formed or cut in a center portion (e.g., a portion that does not extend to an edge) of the assembled display panel 300, for example, an opening shaped as a hole, a rectangular, or any other shape.

While the present invention has been described in connection with certain example embodiments, it is to be understood that the invention is not limited to the disclosed embodiments, but is intended to cover various modifications and equivalent arrangements included within the spirit and scope of the appended claims and equivalents thereof.

What is claimed is:

1. A passive matrix display device comprising:
a first electrode panel comprising a first substrate, a plurality of anisotropic conductive lines on the first substrate extending in a first direction, and a plurality of first electrodes, each of the first electrodes comprising at least two of but less than all of the plurality of anisotropic conductive lines, and others of the plurality of anisotropic conductive lines being arranged between and contacting both adjacent ones of the first electrodes;
a second electrode panel comprising a second substrate, a plurality of anisotropic conductive lines on the second substrate extending in a second direction crossing the first direction, and a plurality of second electrodes, each of the second electrodes comprising at least two of but less than all of the plurality of anisotropic conductive lines, and others of the plurality of anisotropic conductive lines being arranged between and contacting both adjacent ones of the second electrodes; and
a display control medium between the first electrode panel and the second electrode panel configured to be varied by an electric field generated between the first electrodes and the second electrodes.

2. The passive matrix display device of claim 1, wherein the anisotropic conductive lines comprise carbon nanotubes.

3. The passive matrix display device of claim 1, wherein the display control medium comprises an electronic ink sheet.

4. The passive matrix display device of claim 1, wherein the first electrode panel further comprises a plurality of conductive traces at a first end of the anisotropic conductive lines and defining the first electrodes.

5. The passive matrix display device of claim 4, wherein at least one of the plurality of conductive traces has a different length than at least another one of the plurality of conductive traces.

6. The passive matrix display device of claim 4, wherein the first electrode panel further comprises another plurality of conductive traces at a second end of the anisotropic conductive lines.

7. The passive matrix display device of claim 6, wherein ones of the plurality of conductive traces are aligned with corresponding ones of the other plurality of conductive traces.

8. The passive matrix display device of claim 6, wherein the first electrode panel further comprises a plurality of conductive lines and another plurality of conductive lines,
wherein ones of the conductive lines are connected to respective ones of the plurality of conductive traces, and
wherein ones of the other plurality of conductive lines are connected to respective ones of the other plurality of conductive traces.

9. The passive matrix display device of claim 8, wherein each of the other plurality of conductive lines extends along one side of the plurality of anisotropic conductive lines.

10. The passive matrix display device of claim 8, wherein some of the other plurality of conductive lines extend along one side of the plurality of anisotropic conductive lines, and others of the other plurality of conductive lines extend along an opposite side of the plurality of anisotropic conductive lines.

* * * * *